Sept. 27, 1932.    J. LEDWINKA    1,880,095
METHOD OF MAKING TUBULAR ARTICLES
Filed July 29, 1929
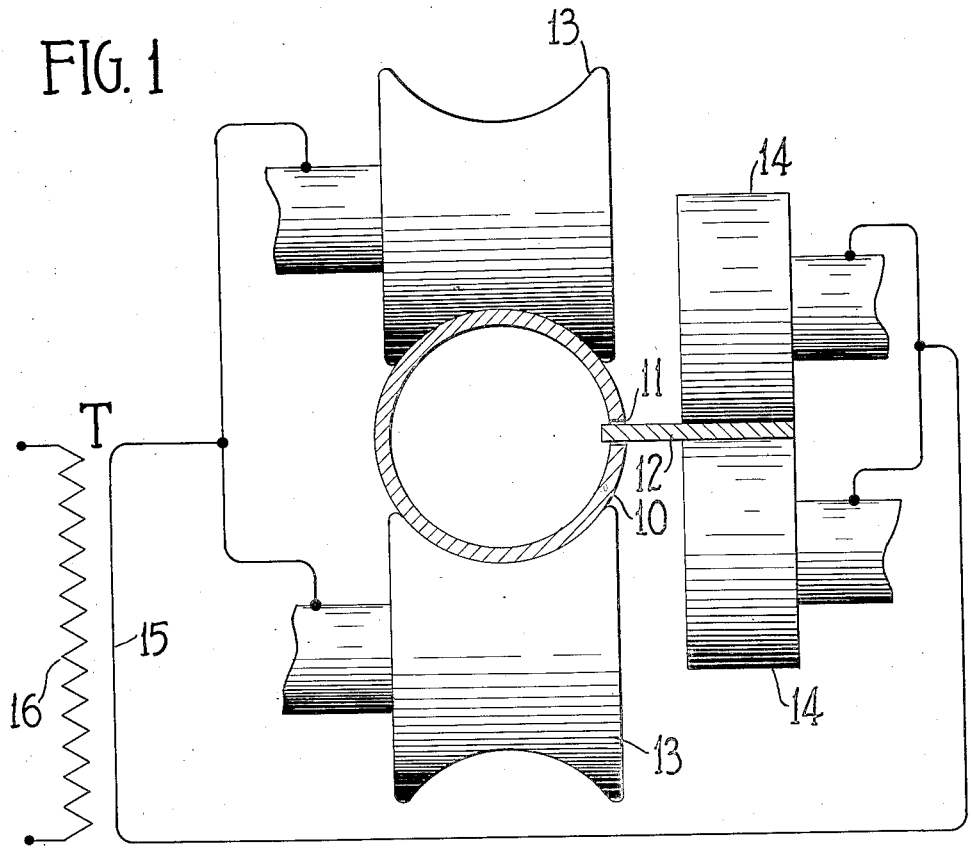
FIG. 1
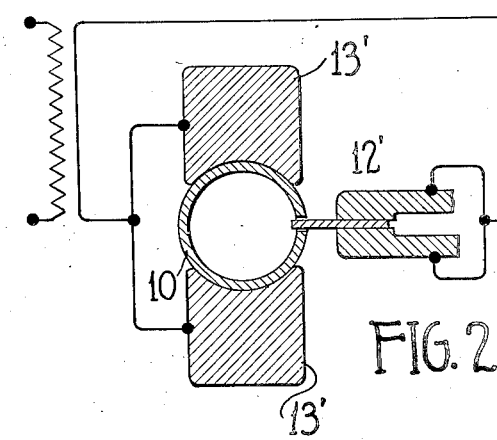
FIG. 2
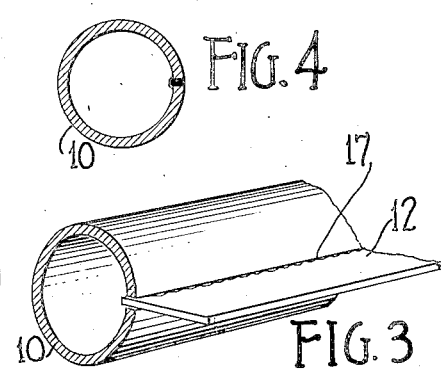
FIG. 4
FIG. 3
INVENTOR.
JOSEPH LEDWINKA.
BY
ATTORNEY.

Patented Sept. 27, 1932

1,880,095

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

METHOD OF MAKING TUBULAR ARTICLES

Application filed July 29, 1929. Serial No. 381,765.

The invention relates to a method of making hollow tubular articles, such as the spokes of a pressed steel wheel or other metal tubing from flat sheet metal stock.

Heretofore in the production of tubing from flat stock it has been the practice to bend the strip into tubular form and to weld together the meeting edges by engaging the electrodes from the opposite poles of the secondary with the work adjacent the line of the weld on opposite sides thereof, but this method was not satisfactory since the welding current was liable to go around the side of the tube remote from the weld on account of the high resistance in the line of the weld and thus resulting in an imperfect weld. To avoid this defect, and to obtain a perfect weld in such tubular objects is the object of the present invention.

This object is attained by bending the sheet into tubular form, but with a space between the edges of the sheet sufficient to permit the insertion of a metal strip, then bringing welding electrodes to bear upon the opposite sides of the tube to press its edges firmly into engagement with the sheet, these electrodes being connected to one pole of the secondary of a welding transformer, and at the same time bringing electrodes connected to the other pole of the secondary firmly to bear upon the strip at a point opposite the first-named electrodes and then passing the welding current. This method insures the passage of the welding current through the joint between the strip and the edges of the tubular article, and heats the metal at the joint to a welding temperature, so that a perfect weld is formed. After the welding, the outer portion of the strip is trimmed off. This method may be carried on rapidly to weld long tubes by making the electrodes roller electrodes and advancing them at a uniform speed along the tube. By making the edge of the sheet extending into the tube corrugated longitudinally, contact is made alternately with the abutting edge of the hollow cross section to be welded, and the welding action is facilitated. This insures uniformity in the weld and renders the welding temperatures attainable with less initial flow of current.

In the accompanying drawing, I have illustrated diagrammatically an apparatus for carrying out the method of my invention.

In these, Fig. 1 diagrammatically represents an apparatus for use in welding long tubes, and Fig. 2, a similar apparatus which may be used with short tubes.

Fig. 3 is a perspective view of a tube and strip prior to welding and showing the inner portion of the strip provided with corrugations for facilitating the welding operation.

Fig. 4 is a cross sectional view of a finished piece of tubing made by my improved method.

In Fig. 1, the tube 10 to be welded is shown having its adjacent edges separated by a gap 11 sufficient to readily receive therebetween the metal strip 12 which is preferably corrugated, as shown in Fig. 3, the tube being shown held between the opposed roller electrodes 13 conforming in contour generally to the shape of the tube so as to obtain a substantial contacting surface therewith, and the strip 12 being similarly clamped between the opposed cylindrical roller electrodes 14.

The electrodes 13 are both shown connected by leads of substantially equal length to the negative pole of the secondary 15 of a transformer T, the primary of which is indicated by numeral 16. Similarly, the rollers 14 are connected to the positive pole of the secondary. When the welding is to commence the electrodes 13 are approached under pressure to press the edges of the tube 10 firmly in engagement with the strip 12 and the same is done with the electrodes 14 and strip 12, and the primary circuit of the transformer T is closed to pass the welding circuit. As the welding proceeds the roller electrodes are advanced slowly along the tube at a rate dependent upon the progress of the weld, the electrodes all being advanced at a uniform rate. The outside of the tube including the strip projecting beyond the tube after welding, may be cleaned off along the line of the weld if a tubular product with no external projections is desired, but the fin produced by the portion of the strip projecting into the tubular part is left intact for most purposes, and in some cases the portion projecting outwardly may also be left intact when a greatly reinforced tubular construction is desired, and where the nature of its use does not make such an outwardly projecting fin undesirable.

I find that by slightly corrugating the portion of the strip extending into the space between the opposed edges of the tube, the welding proceeds more uniformly and a more perfect weld ensues, and besides, the initial welding temperatures are attained with a considerably less initial flow of current. Such corrugations are indicated at 17, Fig. 3.

In Fig. 2, I have illustrated an apparatus for carrying out my method which may be used advantageously with short tubes. In this form of the invention, the tube is indicated by numeral 10, the strip by 12', the electrode clamps engaging the opposite sides of the tube by 13' and the electrode clamps engaging the strip 12', by 14'. The connection of the electrodes to the transformer corresponds in all respects to that shown in Fig. 1.

What I claim is:

1. The method of making hollow reinforced tubular articles which consists in bending a strip of metal into tubular form with the edges thereof spaced apart, then inserting a metal strip into the space between said spaced apart edges and extending outwardly therefrom and pressing the edges of the tubular member in firm contact with the strip, and passing electric welding current in parallel circuits through a portion of the strip extending radially outwardly of the tube and the joints between the spaced apart edges and the metal strip.

2. A method of making metal tubing which consists in bending an elongated strip of metal into tubular form but with a space between the edges thereof, then inserting a slightly corrugated metal strip between the edges so spaced, and then pressing said edges upon said strip by a moving pressure, the while passing welding current from one to the other of said tubular member and strip.

3. The method of making a metal tube smooth on its exterior, which consists in bending a strip of metal into tubular form with a space between its edges, inserting a metal strip into the space between said edges, and pressing the edges of said tubular member in firm contact with the strip, passing an electric welding current between said strip and tubular member and finally trimming off the portion of the strip projecting from the tubular portion.

4. The method of making hollow tubular articles which comprises bending a strip of metal into tubular form with a space between the edges, inserting a metal strip between said edges and extending outwardly therefrom and electrically butt welding said edges to opposite sides of said last-named strip.

In testimony whereof I hereunto affix my signature.

JOSEPH LEDWINKA.